UNITED STATES PATENT OFFICE.

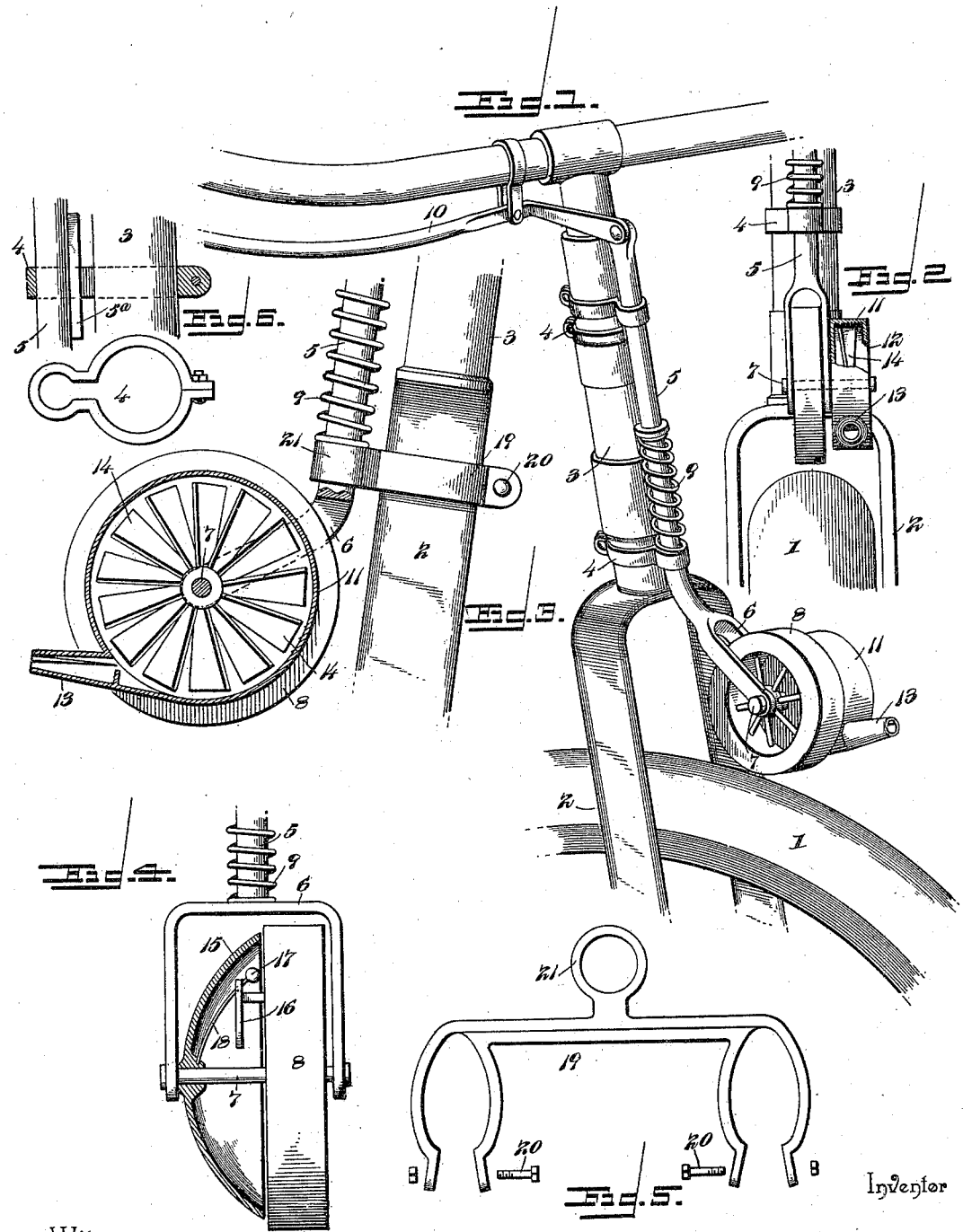

FRANK MADDEN, OF GREELEY, COLORADO.

BICYCLE-ALARM.

SPECIFICATION forming part of Letters Patent No. 585,529, dated June 29, 1897.

Application filed March 18, 1896. Serial No. 583,797. (No model.)

*To all whom it may concern:*

Be it known that I, FRANK MADDEN, a citizen of the United States, residing at Greeley, in the county of Weld and State of Colorado, have invented a new and useful Pneumatic Bicycle Alarm and Brake, of which the following is a specification.

This invention relates to an improvement in combined pneumatic bicycle alarms and brakes; and the object in view is to provide a simple, inexpensive, and efficient device adapted to be mounted upon the head of a machine and capable of being moved into frictional contact with the tire of the bicycle or other vehicle to which it may be applied and to be operated automatically by reason of such contact, the said device being normally held out of contact with the tire by means hereinafter referred to.

The invention consists in a combined pneumatic alarm and brake for bicycles, &c., embodying certain novel features and details of construction and arrangement of parts, as hereinafter fully described, illustrated in the drawings, and finally pointed out in the claim.

In the accompanying drawings, Figure 1 is a perspective view of a sufficient portion of a bicycle to illustrate the application of the present improvement thereto. Fig. 2 is a front elevation of the same, showing the fan-case partly in section. Fig. 3 is an enlarged vertical section through the same, showing a different form of attaching-clip. Fig. 4 is a detail view, partly in section, showing the mechanical alarm in lieu of the pneumatic device. Fig. 5 is a plan view of the double clip which attaches to the front fork. Fig. 6 shows the upper clip in plan and vertical section.

Similar numerals of reference designate corresponding parts in the several figures of the drawings.

Referring to the accompanying drawings, 1 designates the front or steering wheel of an ordinary safety-bicycle, the same being mounted in the usual steering-fork 2, swiveled in the tubular head 3 of the machine-frame.

4 indicates a pair of clips, which are detachably secured to the head of the machine, near the top and bottom thereof, and which form eye-bearings, in which the stem or shank 5 of an adjustable fork or frame 6 is slidably mounted. The stem 5 where it passes through one of the clips 4 has a longitudinal rib $5^a$, which works between opposing portions of the clip and prevents the stem from turning. In the extremities of the arms of the fork 6 is journaled a transverse shaft 7, and upon this shaft is rigidly mounted a friction pulley or wheel 8, which is adapted to be moved into and out of frictional engagement with the tire of the front wheel 1.

Surrounding the stem or shank of the fork is a spiral spring 9, the lower end of which rests against the lower clip 4 and the upper end beneath a fixed stop or projection on the stem 5, so that the tension of said spring is exerted to hold the friction-disk 8 out of engagement with the wheel 1. To the upper end of the stem 5 is pivotally connected a hand-lever 10, which extends along and is fulcrumed on the handle-bar of the machine, where it will be in convenient position to be operated by the rider when desired.

11 designates a hollow shell or case, which surrounds the transverse shaft 7 and is attached to one of the arms of the fork 6, so that it cannot revolve with the shaft. This shell or case is left open at one side, as shown at 12, for the admission of air and is provided with a tangentially-disposed nozzle 13, in the end of which is fitted a pneumatic whistle of any desired form. Within the shell or case 11 and secured rigidly to the shaft 7 is a series of blades or wings 14. These are arranged radially and upon the rapid rotation of the shaft 7 generate a strong blast of air, which passes out through the nozzle 13 and sounds the whistle, the air being supplied to the fan through the side opening 12 in the case or shell referred to.

The construction above described affords a very simple, inexpensive, and efficient pneumatic alarm which, while especially designed for use upon bicycles, may, if desired, be used upon street-cars, windmills, water-motors, or in any place where steam is not accessible. By means of the construction described it is possible to use a very small friction-disk and thereby produce a very rapid rotation of the shaft upon which said disk is mounted and which carries the fan-blades, so that a blast of air amply sufficient to operate the whistle is easily obtained. The friction-disk is normally held out of engagement with the ground-wheel by means of the spiral spring referred to, but may be thrown into frictional engagement with said wheel by simply overcoming the tension of said spring, which may be easily accomplished by the rider with the aid of the lever 10.

To the fork 6 may be attached a stationary gong 15, through which will run the friction-wheel shaft 7. This gong is provided with a spring 18, fastened near the center thereof, and to the free end of this spring is attached a ball or hammer 17. To the friction-wheel 8 is fastened a lateral arm which carries at its outer end a finger 16, so slanted and disposed that it will deflect the spring with each revolution of the wheel 8, the recoil of the spring being great enough to strike and sound the gong. Either the pneumatic alarm or the gong or both together may be employed, all mounted on one and the same shaft. By dispensing with both whistle and gong the small friction-wheel can be used as a brake to retard the speed of the bicycle.

It will be readily seen that a brake of this kind will not burn the tire as do the ordinary metallic shoes or spoon-brakes.

In some patterns of machines a high front fork is used. In such an event and in order to obtain a low-down bearing for the stem 5 a special bracket or double clip 19 is employed, the same comprising two straps or sections having their end portions bent to embrace the fork ends or arms, as shown in Fig. 3. This clip is secured in place by fastenings 20, passing through the ends of the sections and behind the fork ends, and one of the clip-sections is provided with an eye 21 for the stem 5 and against which the lower end of the spring 9 bears. The clips 4 are secured to the fork-stem, so as to turn therewith, thus keeping the alarm always in the same relation to the tire.

The form of the clips employed may be varied to suit the make of bicycle to which the device is to be applied, and other changes in the form, proportion, and minor details of construction may be resorted to without departing from the spirit or sacrificing any of the advantages of this invention.

Having thus described the invention, what is claimed as new is—

A combined brake and alarm attachment for bicycles, comprising a normally spring-elevated vertically-movable stem adapted to be slidably supported on the head of the machine-frame and provided at its lower end with a fork, a transverse shaft 7 connecting the side arms of the fork, a friction brake-wheel 8, fitted to the shaft within the fork, and having a continuous wide flat tread, and an alarm device attached to the fork at one side of the wheel and encircling the shaft 7, a working part of said alarm device being carried by the shaft to provide for the simultaneous operation of the brake and the alarm, substantially as set forth.

In testimony that I claim the foregoing as my own I have hereto affixed my signature in the presence of two witnesses.

FRANK MADDEN.

Witnesses:
ADAM C. PATTON,
GEO. M. JACOBS.